United States Patent
Lu et al.

(10) Patent No.: US 6,519,699 B2
(45) Date of Patent: *Feb. 11, 2003

(54) METHOD AND SYSTEM FOR VOICE GUIDED SECURE ENTRY OF PRIVATE DATA IN A PUBLIC SETTING

(75) Inventors: Qi (NMN) Lu, San Jose, CA (US); Shang-Hua Teng, Champaign, IL (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,594

(22) Filed: Aug. 7, 1998

(65) Prior Publication Data

US 2001/0032316 A1 Oct. 18, 2001

(51) Int. Cl.[7] .................................................. H04K 1/00
(52) U.S. Cl. ......................... 713/182; 380/28; 713/183
(58) Field of Search ............................... 713/182, 183; 380/28

(56) References Cited

U.S. PATENT DOCUMENTS

| | | | | |
|---|---|---|---|---|
| 1,657,411 A | * | 1/1928 | Scherbius | 380/52 |
| 2,975,530 A | * | 3/1961 | Lindstein | 380/56 |
| 4,255,796 A | * | 3/1981 | Gabbe et al. | 364/900 |
| 4,555,805 A |   | 11/1985 | Talbot | 455/26 |
| 5,148,485 A |   | 9/1992 | Dent | 380/46 |
| 5,239,583 A | * | 8/1993 | Parrillo | 380/23 |
| 5,245,652 A |   | 9/1993 | Larson et al. | 379/98 |
| 5,247,497 A |   | 9/1993 | Cohn | 369/26 |
| 5,297,183 A | * | 3/1994 | Bareis et al. | 379/67 |
| RE34,587 E | * | 4/1994 | Crane et al. | 379/88 |
| 5,321,755 A | * | 6/1994 | Vlaar | 380/56 |
| 5,500,899 A |   | 3/1996 | Snow | 380/47 |
| 5,754,652 A | * | 5/1998 | Wilfong | 380/24 |
| 6,055,635 A | * | 4/2000 | Karlsson | 713/184 |

OTHER PUBLICATIONS

David Reilly, SOR Data Encryption With An Infinite Length Key, 1995.*
Murphy, Bielby Roe, Read, o'gorman, Lennig, Automation of alternate billed calls using Speech Recognition IEEE, Jan. 1991.*
Bruce Schneier, Applied Cryptography, pp. 8, 10, 13–15, and 52–53, Oct. 1995.*

* cited by examiner

*Primary Examiner*—Gail Hayes
*Assistant Examiner*—James Seal
(74) *Attorney, Agent, or Firm*—McGinn & Gibb, PLLC; Alison D. Mortinger, Esq.

(57) ABSTRACT

Private user data is securely entered from a public location in a way that the private user data cannot be ascertained by observers. A voice agent generates vocal instructions for a user, instructing the user to enter response data. The vocal instructions are communicated to the user with a telephonic link, in a manner that is secure from observers of entry of the response data. The instructions implement an encryption function, which causes the private user data to be encrypted within the response data. The response data is entered by the user vocally into a telephone, or by pressing buttons on a telephone keypad, or by pressing keys on a computer keyboard. The response data entered by the user is received by a security agent, which ascertains the private user data from the response data, and which also determines the validity of the data.

23 Claims, 3 Drawing Sheets

Prior Art

METHOD AND SYSTEM FOR VOICE GUIDED SECURE ENTRY OF PRIVATE DATA IN A PUBLIC SETTING

BACKGROUND OF THE INVENTION

1. Field of the Invention

The present invention relates to securely entering private data in a public setting. More particularly, the invention concerns a voice guided system, method, and article of manufacture for secure entry of private user data in a public location, such that the data cannot be ascertained

2. Description of the Related Art

Many services, for example, banking, investment, travel, and retail services are accessible on-line via telephones, automated teller machines (ATM's), magnetic card readers, computer-equipped kiosks, and personal computers. With computers, services may be accessed directly, or through the Internet. On-line services are frequently accessed from public locations such as shopping malls, hotel lobbies, airports, subways, trains, airplanes, and streets, where public telephones, ATM's, and computer-equipped kiosks are typically installed. Personal wireless telephones and portable computers are also frequently used to access on-line services from public locations. Accessing on-line services from public places allows users to communicate and obtain important information in a timely fashion.

In order to gain access to on-line services, or to use a calling card to make a telephone call, ordinarily users must identify themselves with a personal identification number or password. Additionally, during the process of accessing on-line services, users are often required to enter additional sensitive data such as credit card numbers or bank account numbers. This information is typically entered by pressing buttons on a telephone keypad or a computer keyboard, or by speaking words into the mouthpiece of a telephone handset.

Experience has shown that entering private data in this manner in a public setting is vulnerable to observation-based security attacks. The attackers often directly observe the entry of the data, or make a video and/or audio recording of the entry of the data. The observed or recorded information is then used to derive the private data, which is then sold or otherwise exploited for the financial gain of the data thief. The theft of telephone calling card numbers entered into public telephones at airports is a well known example of this type of security problem. Generally, due to the use of unsecured data entry methods when accessing on-line services and telephone services from public locations, the theft of private data in public locations is a growing problem.

SUMMARY OF THE INVENTION

Broadly, the present invention concerns a system and method for securely entering private user data from a public location in a way that the data cannot be ascertained by observers of the data entry. In an illustrative embodiment of the invention, a voice agent generates vocal instructions for the user, which instruct the user to enter response data. The vocal instructions are communicated to the user with a telephonic link, in a manner that is secure from observers of entry of the response data. The instructions implement an encryption function. As a result of the use of the encryption function, the private user data is encrypted within the response data in a manner known only to the user, the voice agent, and a security agent. The response data is entered by the user vocally into a telephone, or by pressing buttons on a telephone keypad, or by pressing keys on a computer keyboard. The response data entered by the user is received by the security agent, which ascertains the private user data from the response data, and which also determines the validity of the data.

In one embodiment, the invention may be implemented to provide a system for securely entering private user data in public. Another implementation of the invention concerns a method for securely entering private user data in public. Another implementation of the invention concerns an article of manufacture, such as a data storage medium tangibly embodying a program of machine readable instructions executable by a digital processing apparatus to perform a method for securely entering private user data in public.

The invention affords its users with a number of distinct advantages. Chiefly, the invention provides for the entry of private user data from a public location in a manner that prevents observers of entry of the response data from ascertaining the private user data. Another advantage is that the invention provides for secure entry of private user data with any of a variety of data entry methods. For example, the data may be entered vocally into a telephone, or by pressing buttons on a telephone keypad, or by pressing keys on a computer keyboard. Another advantage is that different encryption functions having different combinations of security strength, useable life span, and demand on the user, can be used as is appropriate for different on-line services. The present invention also provides other advantages and benefits, which are apparent from the following description.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Broadly, the invention concerns a voice guided method and system for secure entry of private user data in a public location in a manner that prevents observers from ascertaining the private user data.

Structure

Figure 1:
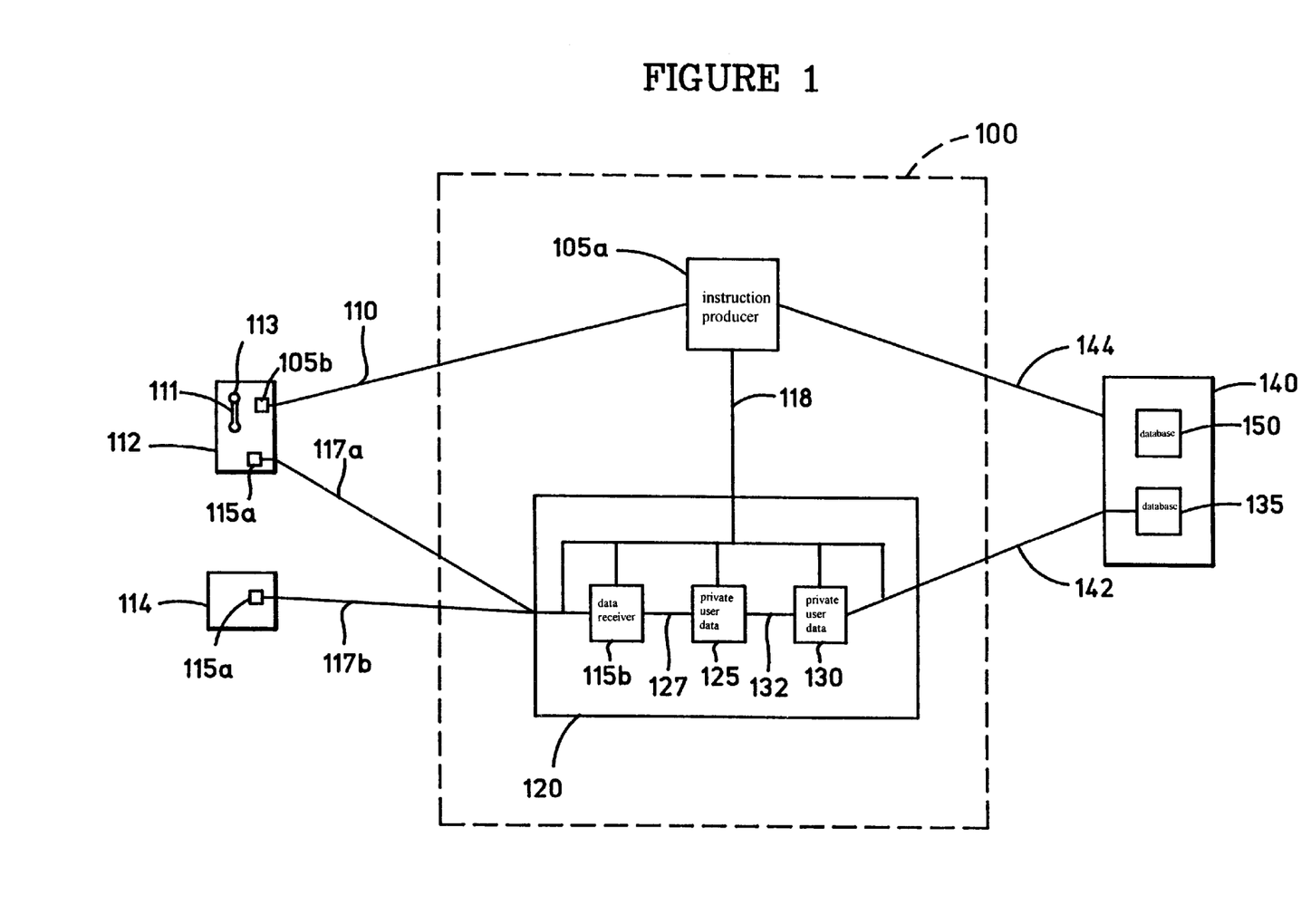
FIG. 1 is a block diagram of a system for securely entering private user data in public in accordance with the invention.

One aspect of the present invention concerns a system for securely entering private user data in public. The hardware components and interconnections of an exemplary system 100 for securely entering private user data in public are depicted in FIG. 1.

The principal components of the system 100 include means for generating vocal instructions for entering response data, means for communicating the vocal instructions for entering response data to the user, means for receiving the response data entered by the user, means for ascertaining the private user data from the response data received from the user, and means for determining the validity of the private user data. Although not within the box outlining the system 100, the audio generator 105*b* and the data transmitters 115*a* are part of the system 100. A service provider, which may be considered to be part of the system, is used with the system. Each of these components will now be discussed.

Means For Generating Vocal Instructions

The means for generating vocal instructions for entering response data is also referred to as a voice agent. "Vocal" is defined to include words spoken by a person, or words synthesized or reproduced by a machine.

The voice agent comprises an instruction producer 105*a* and an audio generator 105*b*. The instruction producer 105*a* comprises a digital signal processing device, which can be implemented with any of a number of commonly available microprocessors or microcomputers. Alternatively, the instruction producer can be implemented with a computer. Preferably, the instruction producer is located remotely from the audio generator 105*b*, which is preferably embedded in a telephone 112. The telephone can be any type of telephone, for example a public telephone, a personal communication service (PCS) telephone, or a cellular telephone. The audio generator can be a microprocessor that includes a digital to analog converter, or a specialized chip for producing audio, and in some embodiments may simply comprise a digital to analog converter.

The instruction producer produces digital data representing vocal instructions instructing the user to enter response data. The vocal instructions implement an encryption function, which is discussed below. Preferably, the encryption function is stored in the instruction producer 105*a* of the voice agent. Alternatively, the encryption function can be stored in a service provider 140, which communicates the encryption function to the instruction producer over a telephonic link or data line 144. All telephonic links discussed herein may be either analog or digital. "Data line" refers to a wire or wires, optic cable, a radio link, a satellite link, or any other way to communicate data between components.

When the instruction producer is located remotely from the audio generator, the digital data representing vocal instructions is communicated from the instruction producer to the audio generator over a telephonic communication link 110. Preferably, the digital data is selectively obtained from a database that is part of the instruction producer of the voice agent. The audio generator 105*b* of the voice agent then produces audio from digital data received from the instruction producer, by digital to analog conversion of the digital data. Alternatively, the database can be located in the audio generator component of the voice agent. In this embodiment, the digital data from the instruction producer of the voice agent instructs the audio generator which data to retrieve from the database to convert into audio. In another alternative embodiment, the audio could be synthesized, rather than being a reproduction of stored digitized speech.

In an alternative embodiment, the instruction producer 105*a* and the audio generator 105*b* of the voice agent can both be located together either, (a) at a location remote from the user (who will be near the receiver 111), (b) in the telephone, or (c) near a telephone handset, for example in a bank automated teller machine (ATM), a public computer, a public computer terminal, or a computer equipped kiosk. If the instruction producer and the audio generator are located together, preferably they are implemented on a single integrated circuit.

In an alternative embodiment, the voice agent can be a device that plays prerecorded analog or digital tapes. Although not preferred, in another alternative embodiment, the voice agent can be a human operator.

Means For Communicating Vocal Instructions

The means for communicating vocal instructions to the user can be any means that provides for communication of the vocal instructions to the user in a manner that is secure from observers of entry of response data by the user. "Observers of the entry of response data" includes observers directly observing and/or listening to the entry of the response data, and also includes observers of a video recording of the entry of the response data, and/or listeners of an audio recording of the entry of the response data.

The means for communicating the vocal instructions is preferably the telephonic communication link 110 and handset 111. This is the case when the instruction producer 105*a* of the voice agent is located remotely from the user and the audio generator 105*b* of the voice agent is located near the user, for example in the telephone, in an ATM machine, a public computer, a public computer terminal, or a computer equipped kiosk. This is also the case when both the instruction producer and the audio generator of the voice agent are located remotely from the user. The handset 111, which is preferably part of the telephone 112, includes a speaker 113. Alternatively, rather than being part of a telephone, the handset could be connected directly to an ATM machine, public computer, public computer terminal, or computer equipped kiosk. The telephonic communication link and handset provide for communication of the vocal instructions in a manner that is secure from observers of entry of the response data by the user, because only the user, and not observers, can hear the vocal instructions generated by the speaker in the telephone handset used by the user.

As used herein, "telephonic link" includes wires, optic cable, satellite links, and/or radio links, and any other devices used for communicating telephonic signals. Although the means for communicating the vocal instructions to the user requires only a one-way data channel, preferably, the telephonic communication link comprises a two-way telephone line. In another embodiment, the digital data from the instruction producer of the voice agent could be transmitted with a radio link or a satellite link directly to the audio producing component of the voice agent.

If both components of the voice agent are located remotely from the user, the audio vocal instructions are communicated to the user with the telephonic link 110 and the handset 111. In another embodiment where both components of the voice agent are located remotely from the user, the audio vocal instructions could be transmitted over a secure radio or satellite link into headphones or an earphone used by the user.

If the instruction producer of the voice agent and the audio generator of the voice agent are both located in the telephone, then the means for communicating the vocal instructions is simply the handset 111, which is electrically connected to the telephone 112. If the instruction producer of the voice agent and the audio generator of the voice agent are both located in an ATM machine, a public computer, a public computer terminal, or a computer equipped kiosk, then the means for communicating the vocal instructions is a handset electrically connected to the ATM machine, public computer, or public computer terminal, computer equipped kiosk.

In applications such as computer equipped kiosks or other publicly located computers or computer terminals, the telephone at the user end of the telephonic communication link is preferably incorporated into, or attached to, the kiosk or public computer or computer terminal. Alternatively, rather than being incorporated into or attached to the computer, the telephone could be located near the computer. Although it may be possible for the user to receive the instructions over a telephone that is not located near the computer, and then subsequently enter the response data, preferably the telephone is located close enough to the computer to allow the user to simultaneously receive the instructions and operate the computer.

In addition to establishing communication between the voice agent and the user in order to communicate the vocal instructions to the user, communication must also be established between the user and an on-line service or telephone service in order to obtain services. Services can be received from a service provider with the telephone 112 or with a computer 114. The computer 114 can be a personal computer, a portable personal computer, a public computer, a public computer terminal, a computer or computer terminal in a kiosk, or any other computer or computer terminal that can be used to access an on-line service. If a telephone is used for accessing a service, then the telephonic link used for communicating the vocal instructions to the user is also used to access the service. If a computer is used to access an on-line service, then an additional communication link between the computer and the service provider is generally required, in addition to the communication link between the voice agent and the user, although it may be possible to use the same communication link for both functions.

In addition to being used for accessing on-line services, the system 100 can also be used for securely entering calling card numbers into public telephones to enable the user to make telephone calls. In this case, the telephone services are provided to the user with the same telephone used to receive the vocal instructions.

Means For Receiving Response Data

Preferably, the means for receiving the response data is capable of receiving both vocal response data spoken by the user into a telephone mouthpiece, and electronic response data. Electronic response data includes analog or digital electronic signals produced when the user pushes keys on a telephone keypad or a computer keyboard, and other electronic signals representative of data.

The means for receiving the response data comprises two subcomponents, a data transmitter 115a and a data receiver 115b. The data transmitter is located in the telephone 112 or computer 114 that is used to generate the response data. The data receiver is located remotely from the user, and is preferably part of a security agent 120. The security agent is preferably a microprocessor or microcomputer with data storage capability, which is configured for receiving the response data and for accomplishing other functions described herein. Alternatively, the security agent can be a computer system. Preferably, the instruction producer of the voice agent, and the security agent, are implemented on the same integrated circuit, and preferably are implemented with the same microprocessor. Alternatively, the data receiver can be a discrete component.

The data transmitter generates interrupt signals and transmits data representative of either buttons on a telephone keypad or keys on a computer keyboard. The transmitted signals and data can be either analog or digital, and are preferably digital. The data receiver 115b receives the data transmitted from the data transmitter 115a.

Preferably, the data receiver includes hardware and voice recognition software for receiving and deciphering vocal response data spoken by the user into a telephone mouthpiece. In an alternative embodiment, the means for receiving the response data could include a human operator for receiving voice data, although this is not preferred.

The response data is preferably communicated over a telephonic link to the data receiver. Although it is possible for the telephonic link to be one-way, preferably it is a two-way telephonic link. If the response data originates from telephone 112, then telephonic link 117a is used. If the response data originates from computer 114, then telephonic link 117b is used. Alternatively, other communications channels, for example a radio or satellite link, could be used. If the response data is entered into the telephone 112 rather than the computer 114, the telephonic link used for communicating the response data to the data receiver is preferably the same telephonic link 110 used for communicating the vocal instructions to the user. In this case the response data will be transferred from the voice agent to the data receiver with data line 118 or with an equivalent connection.

Means For Ascertaining The Private User Data

Preferably, the means for ascertaining the private user data 125 is also a subcomponent of, or a subfunction of, the security agent 120. In an alternative embodiment, the means for ascertaining the private user data could be a discrete component connected to the data receiver with data line or telephonic link 127. The means for ascertaining the private user data implements logical and/or mathematical operations, which are based on knowledge of the encryption function used to encrypt the private user data, in order to ascertain the private user data from the response data received from the user.

Means For Determining The Validity Of The Private User Data

Preferably, the means for determining the validity of the private user data 130 is also a subcomponent of, or a subfunction of, the security agent 120. In an alternative embodiment, the means for ascertaining the private user data could be a discrete component connected to the means for ascertaining the private user data with data line or telephonic link 132. In order to determine the validity of the private user data, the means for determining the validity of the private user data access a validity database 135, which is preferably part of the service provider 140. With either the microprocessor of the security agent, or with other logic circuitry, the private user data is compared with data in the validity database in order to determine the validity of the private user data. The databases discussed herein can be stored on any data storage device or combination of data storage devices, for example a hard disk drive, floppy disk(s), random access memory chips, read only memory chips, magnetic tape, cd-rom, dvd, or punch cards.

Service Provider

If the private user data is determined to be valid, the service provider 140 provides services to the user. The service provider is preferably a computer with a service database 150. The service provider retrieves and/or manipulates data as requested by the user. The service provider could comprise a network of computers. Although not required, the service provider computer could be the same computer used for the voice agent and/or the security agent, in which case the service provider 140 and databases 135 and 150 would be part of the system 100.

The services are communicated to the user's computer 114 or telephone 112, depending on which device is being used by the user to access the on-line service. The services are preferably communicated over a telephonic link, preferably the same telephonic link used for entry of the response data. If the services are being accessed on the computer 114, the services are preferably provided to the user through telephonic link or data line 142, data lines traversing the security agent 120, and telephonic link 117b.

Alternatively, services could be provided to the computer 114 through telephonic link or data line 144, data line or telephonic link 118, data lines traversing the security agent 120, and telephonic link 117b. If the services are being accessed on the telephone 112, the services can be provided over telephonic link 117a, data lines traversing the security agent 120, and data line or telephonic link 142, or, over telephonic link 110 a data line traversing the instruction producer 105a, and data line or telephonic link 144, or, with a combination of these telephonic links and/or data lines if data line or telephonic link 118 is also used. Data lines and telephonic links 110, 118, and 144 can be interconnected in any combination at the instruction producer 105a. Likewise, data lines and telephonic links 117a, 117b, 118, and 142 can be interconnected in any combination at the security agent 120. Data line or telephonic link 118 can be connected to any of the components of the security agent. Instead of, or in addition to using telephonic links, the services could be communicated with a radio or satellite communication link.

When the service provider is providing services to the telephone 112, there is two-way communication between the telephone and the service provider. Likewise, when the services are provided to the computer 114, there is two-way communication between the computer and the service provider.

Any of a myriad of services can be provided to the user with the service provider, for example, banking, investment, travel, and retail services. If the user desires telephone services, the service provider is the telephone network.

Operation

Figure 2:
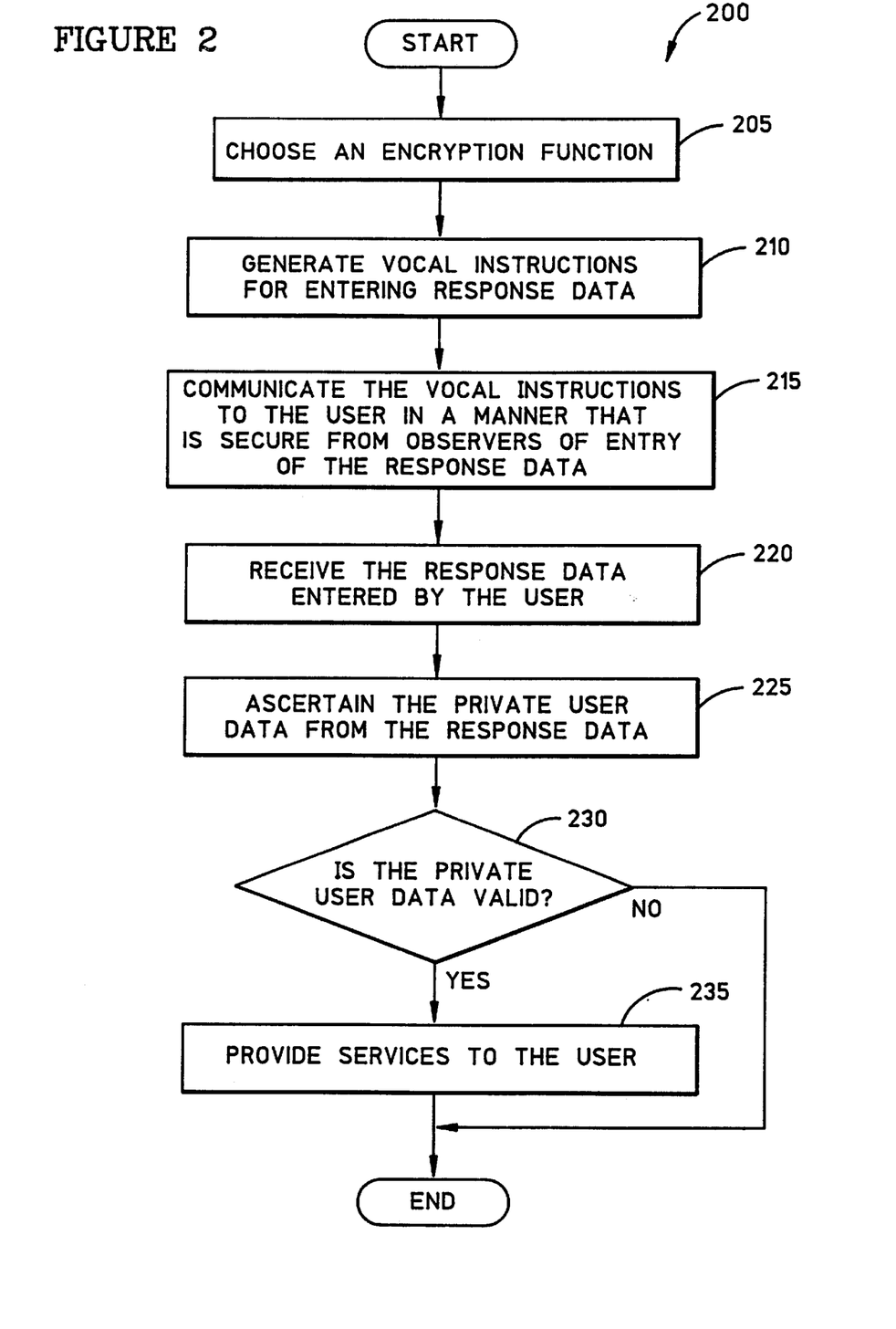
FIG. 2 is a flow chart illustrating a method for securely entering private user data in public, according to one illustrative embodiment of the invention.

In addition to the hardware embodiments described above, a different aspect of the invention concerns a method for securely entering private user data in public, which is illustrated by the tasks 200 of the flowchart in FIG. 2. For clarity of explanation, but with no limitation intended thereby, the tasks 200 are illustrated in the context of the hardware components of FIG. 1.

Choosing An Encryption Function

The vocal instructions for entering response data that are communicated to the user implement an encryption function or scheme E. Encryption is used to prevent observers of the entry of the response data from ascertaining the private user data. Encryption is necessary because of the valuable and sensitive nature of the private user data, which can be, for example, an identification number, a password, an account number, a social security number, and/or other important information. The private user data can include numbers, letters, symbols, and/or any other type of identifying information. Generally, the private user data can be any private information that the user is required, or desires, to enter in a public location.

Due to the encryption of the private user data with the encryption function, observers watching the user push buttons on a telephone keypad or a computer keyboard, and eavesdroppers listening to the user speak into a telephone handset, will not be able to ascertain the private user data. For example, suppose the private user data is D. The encryption of D, which is denoted E(D), is the response data that is entered. Observers of the entry of the response data E(D) are not able to derive the private user data D as long as they do not know the encryption function E, which is securely communicated to the user.

There are large collections of encryption functions E that service provider systems or voice agents can randomly select. However, it is possible for the attackers to experience all of the encryption functions E themselves. Therefore, conservative security analysis assumes that all of the encryption functions used by a particular on-line service provider will eventually be known to the attackers.

In task 205 of FIG. 2, an encryption function is chosen. The encryption function E can be chosen in advance and programmed into the system 100 before the user accesses the system. In this case the encryption function E will be stored in the instruction producer 105a or in the service provider 140. The encryption function E can be periodically changed. Alternatively, the encryption function E can be chosen by the system when the user accesses the system 100, from a bank of encryption functions stored either in the instruction producer 105a or in the service provider 140. There are a large number of choices for the encryption function E. A particular encryption function E is selected based on the nature of the on-line service and the type of data involved.

There are three key metrics of the encryption function E that form the basis for systematically selecting E. The first metric of E is called security strength, which is denoted SS(E). Given the encrypted E(D), SS(E) represents the number of possible choices of D. The larger the number of possible choices for D, the stronger the security strength of E. Consider, for example, a very simple encryption function E that maps any input D into P+D+S where P is a prefix with p characters, S is a suffix with s characters, and "+" means concatenation. For this example, the total number of choices for D given E(D) is p+s+1.

The second metric of E is called the life-span of E, denoted LS(E), which indicates the number of times that a given encryption function E can be used. When the same encryption function is repeatedly used, it may be exposed multiple times to the same attackers in the same public setting. Due to the multiple exposures, the attackers may be able to deduce a smaller set of possible values that D may have for an observed E(D), making determination of the actual value of D more likely. Thus, for many encryption functions E, if the encryption function E is repeated n times, for n=1, 2, 3, . . . , the security strength SS(E) is reduced with each repetition. The relationship between SS(E) and n is called the life-span of E. An accurate mathematical representation of the life-span of many encryption functions can be difficult to compute. However, even with a rough estimation, this metric can play a very important role in selecting an appropriate encryption function for a particular on-line service. For example, the life span of an encryption function to be used multiple times during a period of potential observation by an attacker, for example at a public pay phone, will be chosen to have a longer life span than an encryption function expected to be used much less frequently during a reasonable period of observation by an attacker, for example at a bank automated teller machine (ATM).

The third metric of E is called user demand, and is denoted UD(E). This metric measures the degree of difficulty, or additional data entry burden, for a user to enter E(D) as compared to entering D. A simple method for measuring UD is to compare the "distance" between E and D. The "distance" between two sequences of characters is typically the number of edit functions, such as, insert a character, delete a character, and replace a character. Additionally, different edit functions may have different psychological effects on human users, which may be taken into consideration as a weighting factor in the UD metric.

The above three metrics form the design space for systematically selecting the encryption function E that best suits a particular on-line service. For example, banking services are typically accessed infrequently but require high security protection because of the extent of the financial damage that could incur if the attackers decipher the private data. Consequently, an appropriate encryption function E for accessing banking services requires high SS(E), which usually leads to high UD(E), but does not require a long LS(E) due to the relatively infrequent use. Another example is public pay telephones, for which the required security protection is not as great. Thus, an appropriate encryption function E for accessing telephone services may have a low SS(E), which usually leads to a low UD(E), but requires a relatively long LS(E) because the same private data may be entered multiple times in the same pay phone in a relatively short period of time.

Several data encryption functions E, also referred to as schemes, which can be used with the present invention will now be discussed.

Voice Guided Exclusive-Or

This approach assumes the user has a private password of K bits $P_1, P_2, \ldots P_K$. To enter this password in an informationally secure fashion, the voice agent generates a random K bit sequence $R=r_1, r_2, r_K$. The voice agent then gives the following voice instruction "I will read you K bits one by one. If your bit agrees with mine, type or speak 0. Otherwise, type or speak 1. Now, my first bit is $r_1$ (answer), my second bit is $r_2$ (answer) . . . " The security agent receives the answer $A=a_1, a_2, \ldots a_K$, and then determines $p_1, p_2, \ldots, p_K$, by determining the exclusive-or of each pair of $a_i$ and $r_i$.

This scheme is informationally secure as long as the voice channel is secure because R is a random bit sequence, and consequently, the entered answer sequence A is also a random bit sequence. Exposing A in the public setting does not reveal any information to the observers. Consequently, the life-span LS(E) of this encryption function E does not decrease, regardless of the extent of the repeated use. Also, the security strength SS(E) remains constant, with $2^K$ possible choices.

The demand on the user with this encryption function E is minimal, because the user merely has to decide whether each bit recited by the voice agent is the same or different than the user's corresponding bit. It is not necessary for the user to be aware of, or to be concerned with, the exclusive-or operation performed by the security agent.

This scheme may not be practical because human users do not normally use bit sequences to represent data. However, it is an important informationally secure voice guided data entry scheme that other schemes can be based upon.

Voice Guided Binary Search

This scheme performs a voice guided binary search for each of the digits in a user's password. For this example, suppose the user wants to securely enter K digits $d_1, d_2, \ldots, d_K$. The system will use the binary search process shown in Table 1 to enter each of the digits $d_i$.

TABLE 1

Set the initial value of Low to 0 and High to 9.
Voice-Guided-Binary-Search (Low, High) {
   If (Low = High) {return "the entered digit is Low";}
   mid = Low + High/2;
   answer-yes = random-number mod 2; /* it is a random 0 or 1 */
   answer-no = the complement of answer-yes; /* 0 or 1 opposite to answer-yes */
   ask the question "if your number is greater than mid, enter or say answer-yes,
   otherwise, enter or say answer-no";
   if (the entered answer is answer-yes) {
      Perform Voice-Guided-Binary-Search (mid + 1, High);

TABLE 1-continued

} else {
      Perform Voice-Guided-Binary-Search (low, mid);
   }
}

With this scheme, the voice agent asks four questions to determine the value of each 20-digit. Thus, if a password has K digits, the user must answer 4 K questions. Although this may be tedious, this process is informationally secure because the entire sequence of user inputs is a random sequence of 0s and 1s.

The total number of questions and answers required to determine all of the digits can be reduced from 4 K in two ways. The first approach is to use only 8 of the 10 possible single digit numbers to represent each digit in a user's password. For example, only digits 1–8 could be used. This would allow each digit to be determined with 3 answers instead of 4. For example, the current social security number is 9 digits long, which would take 36 answers to enter. However, if 10 digits having the values 1–8, are used instead of 9 digits having the values 0–9, only 30 answers will be required to determine all of the digits, and this approach will have greater security because $8^{10}$ is greater than $10^9$. The second approach for reducing the number of answers is asking fewer but more direct questions when the first N entered digits are correct. If N is a relatively large number, for example 6 or 7, the chance of someone having correctly guessed all of them is extremely small. For the remaining digits the voice agent can ask more direct questions. For example, if the $8^{th}$ digit should be 2, the voice agent can ask "is your $8^{th}$ digit bigger than 3," and it will take only two answers to enter the digit.

Voice-Guided Random Replacement

This is a very simple scheme for entering a K digit password. The system simply runs through the process shown in Table 2.

TABLE 2

For (I = 1; I<=K; I++) {
   Generate a random permutation π from {0 . . . 9} to {0 . . . 9}.
   Read the following instruction:
   For (J = 1;J < 10; J++) {
      "If your next digit is J, please enter π(J)".
   }
}

This scheme is also informationally secure. The number of answers for the user to enter is only K. A drawback is that the voice instructions can be too long for users to remember. This scheme is useful for passwords that use a small number of values for each character or digit.

Voice Guided Random Embedding

Suppose that the user has a password of K digits $d_1, d_2, \ldots, d_K$. The voice agent generates a random code of N digits $r_1, r_2, \ldots r_N$ and a random K indices $i_1, i_2, \ldots i_K$ from {1, . . . , N}. It then generates the voice instructions shown in Table 3:

TABLE 3

For (p = 1; p <=N; p++) {
   If (p is not in {$i_1, i_2, \ldots, i_K$})
      "please enter $r_p$";
   else {

TABLE 3-continued

```
        /* p must be i_j */
        "please enter the j^th digit";
    }
}
```

This scheme randomly inserts additional digits into the user's password. Compared to the above schemes, there is less demand on the user. However, this scheme is not informationally secure, because each time the password is entered it reveals information to observers. The life-span of this scheme is dependent upon the number of random digits N.

There are numerous other possible choices for the encryption function E. The encryption function chosen should strike a balance between the security strength SS(E), life-span LS(E), and user demand UD(E), based on the nature of the on-line service and the data to be entered.

Generating Vocal Instructions

In task 210, vocal instructions for entering response data are generated, preferably by the voice agent. The vocal instructions implement the previously chosen encryption function.

Communicating The Vocal Instructions

The user telephones the information producer of the voice agent in order to receive the vocal instructions. A service provider may offer different telephone numbers with different levels of security for accessing a service.

In task 215, the vocal instructions for entering response data are communicated to the user. The vocal instructions are communicated in a manner that is secure from observers of entry of the response data by the user, preferably with the telephonic link 110 discussed above.

Receiving The Response Data

In response to the vocal instructions, the user enters response data that is an encryption of the private user data. The response data may be entered by the user either during or after receiving the instructions, depending on the nature of the instructions.

In task 220, the response data entered by the user is received, preferably by the data receiver 115b discussed above. The received data may be either vocal response data or electronic response data, as previously discussed.

Ascertaining The Private User Data

In task 225, the private user data is ascertained from the response data received from the user. Preferably, the means for ascertaining the private user data 125 of the security agent 120 is used to ascertain the private user data. To ascertain the private user data, the means for ascertaining the private user data performs logical and/or mathematical operations based on knowledge of the encryption function.

Determining The Validity Of The Data

In task 230, the validity of the private user data is determined, preferably with the means for determining the validity of the private user data 130 of the security agent 120. After the private user data has been ascertained, it is compared with data in the validity database 135, to determine whether the private user data entered is valid, as discussed above.

Providing Services To The User

In task 235, services are provided to the user if it has been determined that the private user data is valid. After the validity of the private user data is established, the service provider 140 offers services to the user.

Article of Manufacture

As an example of an embodiment of the method of the present invention, the method of the invention may be implemented by operating a digital processing apparatus to execute a sequence of machine readable instructions. In an illustrative embodiment of the invention, the machine readable instructions may comprise lines of "C" and assembly language code. These instructions may reside in various types of data storage media. In this respect the present invention concerns an article of manufacture, comprising a data storage medium tangibly embodying a program of machine readable instructions executable by a digital data processor to perform a method for securely entering private user data in public. The digital data processor, which may also be referred to as a digital processing apparatus, may be any device or combination of devices, described above, that are part of the system 100.

Figure 3:
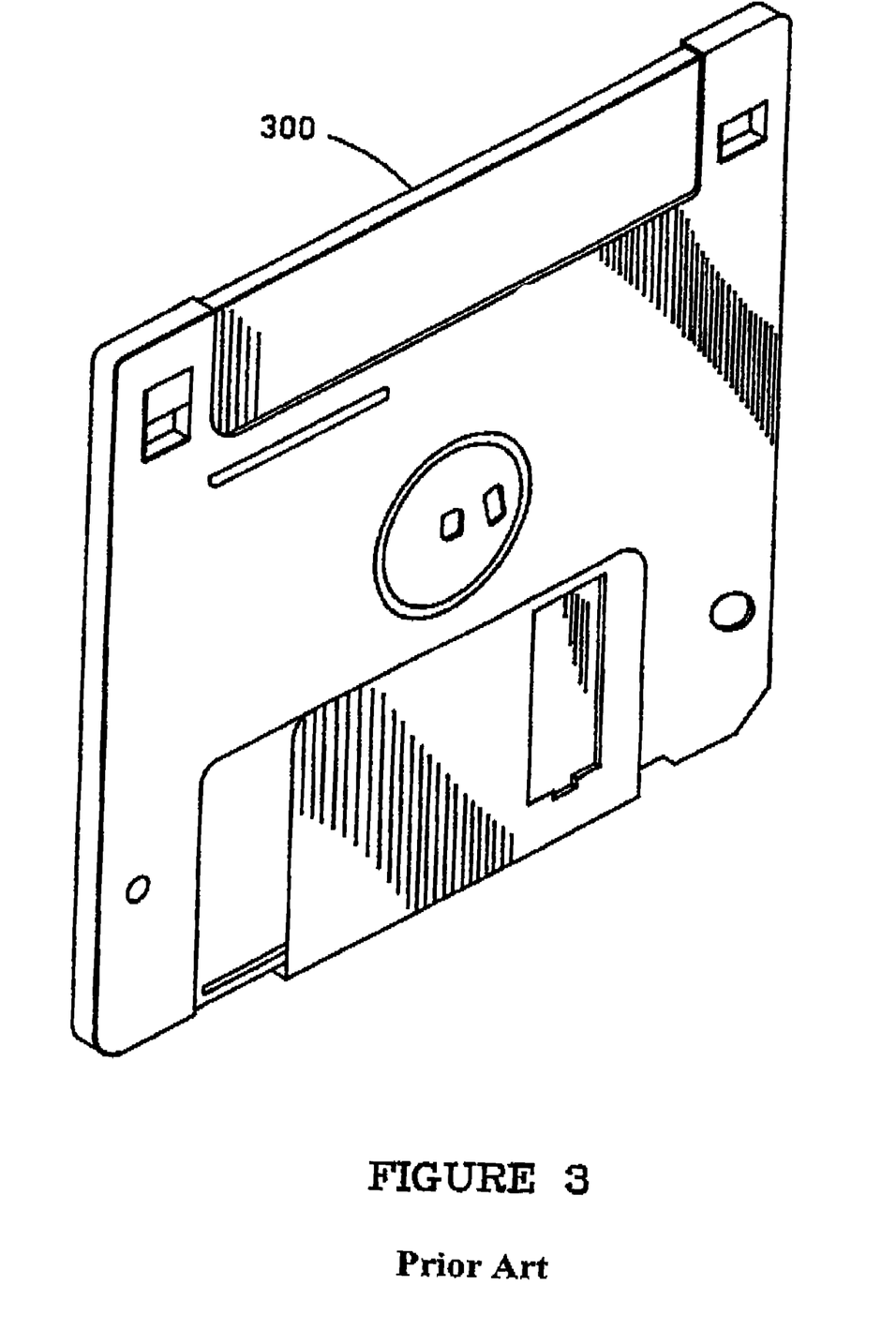
FIG. 3 is an article of manufacture embodied by a conventioned data storage medium in accordance with the invention.

The data storage medium may be, for example, a magnetic data storage diskette 300, illustrated in FIG. 3. Alternatively, instead of, or in addition to the magnetic data storage diskette, the data storage medium may be a conventional "hard drive", a RAID array, random access memory (RAM), read-only memory (ROM), an optical storage device (for example, a WORM), magnetic tape, paper "punch" cards, and/or other data storage media, or any combination of these media. Preferably, the data storage medium is a hard drive.

While there have been shown what are presently considered to be preferred embodiments of the invention, it will be apparent to those skilled in the art that various changes and modifications can be made herein without departing from the scope of the invention as defined by the appended claims.

What is claimed is:

1. A method for a user securely entering private user data using a system in public, the method comprising:
   said system choosing an encryption function based on one or more of a security strength user for said encryption function, a life span of said encryption function, and a data entry to said user burden of said encryption function;
   generating vocal instructions for entering response data, the vocal instructions implementing the encryption function;
   communicating the vocal instructions for entering response data to the user, the vocal instructions being communicated in a manner to be secure from observers of entry of the response data by the user;
   receiving the response data entered by the user, wherein said response data is entered vocally by said user;
   ascertaining the private user data from the response data received from the user; and
   determining the validity of the private user data.

2. The method of claim 1 wherein the exclusive-or encryption function is voice guided.

3. The method of claim 1 wherein the binary search is voice guided.

4. The method of claim 1 wherein the random replacement encryption function is voice guided.

5. The method of claim 1 wherein the random embedding encryption function is voice guided.

6. The method of claim 1 wherein receiving the response data comprises receiving electronic response data entered by the user.

7. A system for a user securely entering private user data in public, comprising:
   means for generating vocal instructions for entering response data; wherein said vocal instructions implement an encryption function based on one or more of a security strength needed for said encryption function chosen by said system, a life span of said encryption function, and a data entry burden to said user of said encryption function;

means for communicating the vocal instructions for entering response data to the user, the vocal instructions being communicated in a manner to be secure from observers of entry of the response data by the user;

means for receiving the response data entered by the user, wherein said response data is entered vocally by said user;

means for ascertaining the private user data from the response data received from the user; and means for determining the validity of the private user data.

8. The system of claim 7 wherein the exclusive-or encryption function is voice guided.

9. The system of claim 7 wherein the binary search is voice guided.

10. The system of claim 7 wherein the random replacement encryption function is voice guided.

11. The system of claim 7 wherein the random embedding encryption function is voice guided.

12. The system of claim 7 wherein the means for generating vocal instructions for entering response data comprises an instruction producer and an audio generator.

13. The system of claim 7 wherein the means for communicating the vocal instructions to the user comprises a telephonic communication link.

14. The system of claim 7 wherein the means for receiving the response data comprises means for receiving vocal response data entered by the user.

15. The system of claim 7 wherein the means for receiving the response data comprises means for receiving electronic response data entered by the user.

16. The system of claim 7, further comprising a service provider for providing services to the user if the private user data is determined to be valid.

17. A system for a user securely entering private user data in public, comprising:

a voice agent configured to generate vocal instructions implementing an encryption function for entering response data based on one or more of a security strength needed for said encryption function chosen by said system, a life span of said encryption function, and a data entry burden to said user of said encryption function;

a telephonic communication link configured to communicate the vocal instructions for entering response data to the user, the vocal instructions being communicated in a manner to be secure from observers of entry of the response data by the user;

a security agent configured to receive the response data entered by the user, ascertain the private user data from the response data, and determine the validity of the private user data, wherein said response data is entered vocally by said user; and a wherein said service provider configured to provide services to the user if the private user data is determined to be valid;

providing services to the user if the private user data is determined to be valid.

18. An article of manufacture comprising a data storage medium tangibly embodying a program of machine-readable instructions executable by a digital processing apparatus to perform a method for a user securely entering private user data using a system in public, the method comprising:

said system choosing an encryption function based on one or more of a security strength needed for said encryption function, a life span of said encryption function, and a data entry burden to said user of said encryption function;

generating vocal instructions for entering response data, the vocal instructions implementing the encryption function;

communicating the vocal instructions for entering response data to the user over a communications link that is secure from observers of entry of the response data by the user;

receiving the response data entered by the user, wherein said response data is entered vocally by said user, ascertaining the private user data from the response data received from the user; and determining the validity of the private user data; p1 providing services to the user if the private user data is determined to be valid.

19. The article of manufacture of claim 18 wherein the exclusive-or encryption function is voice guided.

20. The article of manufacture of claim 18 wherein the binary search is voice guided.

21. The article of manufacture of claim 18 wherein the random replacement encryption function is voice guided.

22. The article of manufacture of claim 18 wherein the random embedding encryption function is voice guided.

23. The article of manufacture of claim 18 wherein receiving the response data comprises receiving vocal response data entered by the user.

* * * * *